United States Patent [19]

Groninger, Jr. et al.

[11] 3,903,304

[45] Sept. 2, 1975

[54] ACYLATED MYOFIBRILLAR PROTEIN BINDER FOR AQUACULTURAL FEEDS AND FISH BAITS

[75] Inventors: Herman S. Groninger, Jr.; Ruth Miller, both of Seattle, Wash.

[73] Assignee: The United States of America as represented by the Secretary of Commerce, Washington, D.C.

[22] Filed: Nov. 13, 1973

[21] Appl. No.: 415,469

[52] U.S. Cl. .................... 426/1; 426/657; 424/84; 260/112 R
[51] Int. Cl.$^2$.......................................... A23L 1/31
[58] Field of Search ....... 426/1, 212, 224, 364, 370, 426/371, 376, 382, 805; 424/84; 260/112 R; 106/124, 125

[56] References Cited
UNITED STATES PATENTS
| | | | |
|---|---|---|---|
| 2,728,759 | 12/1955 | Keil | 426/364 |
| 3,432,311 | 3/1969 | Gruner | 426/212 |
| 3,726,689 | 4/1973 | Patashnik | 426/1 |

*Primary Examiner*—Norman Yudkoff
*Assistant Examiner*—Hiram H. Bernstein
*Attorney, Agent, or Firm*—David Robbins; Alvin Englert

[57] ABSTRACT

Protein binder for fish feeds and firm, attrition-resistant aquacultural feed and fish bait compositions having the texture of natural muscle tissue consisting essentially of a nutritionally valuable acylated myofibrillar protein material.

Further, a method for preparing firm, attrition-resistant aquacultural feed and fish bait materials having the texture of natural muscle tissue which comprises the steps of blending an aqueous saline dispersion containing from about 1 percent to about 10 percent by weight of an acylated myofibrillar protein material with at least one nutritive component and precipitating the resulting blend in water maintained below pH 4.5.

9 Claims, No Drawings

ACYLATED MYOFIBRILLAR PROTEIN BINDER FOR AQUACULTURAL FEEDS AND FISH BAITS

This invention relates to a nutritionally-valuable binder for nutritive components of firm, attrition-resistant aquacultural feeds and fish baits. In a particular aspect, this invention relates to compositions using this binder for firm, attrition-resistant aquacultural feeds and fish baits having the texture of natural muscle tissue. In a further development, the invention relates to blending an aqueous saline dispersion containing from about 1 to 10 percent by weight of an acylated myofibrillar protein material with at least one nutritive component (for fish) and precipitating the resulting blend in water maintained below pH 4.5.

DESCRIPTION OF PRIOR ART

Wide-spread interest in compositions suitable for aquaculture fish baits has been occasioned by awareness of the need to develop economical procedures to grow fish and other aquatic animals as a protein source for human consumption and by interest in providing superior bait for sport and commercial fisherman.

Thus, Patashnik et al. teach, in U.S. Pat. No. 3,730,728, the production of animal food and bait from raw, whole fish by emulsification in a saline medium and coagulation of the protein and fish fat with kelp (seaweed). However, fish food and bait gels prepared by the method require prolonged storage of precursor emulsions to yield semi-stable gels, which preferably are heat coagulated to produce stable gels.

It will be apparent that deficiencies in the Patashnic U.S. Pat. No. 3,730,728 process include the necessity of a slow coagulation step or of heat coagulation and the fact that the kelp-derived binder is essentially carbohydrate and, therefore, dilutes the protein present in the fish food composition. It will also be apparent that this method does not provide for the production of prilled or extruded food compositions readily accepted by many aquatic creatures.

Patashnik, in another U.S. Pat. No. 3,726,689, teaches use of dissolved myofibrillar protein from raw whole fish as an emulsifier and gelling agent for animal food or bait. However, rigid temperature control is required to prevent premature gelation and the process also requires a heat coagulation step.

Ayukawa et al. disclose in U.S. Pat. No. 3,671,261 the preparation of artificial shrimp feed resembling vermicelli. The feed comprises a protein source and a gum binder. However, the gum provides no protein value and, therefore, dilutes the protein value of the feed.

As to the culture of valuable invertebrate crops, e.g. shrimp and crawfish, it is recited in "Coastal Studies Bulletin, No. 5, Special Sea Grant Issue," February 1970, at 158, that pelletized fish chows or feeds are generally unsatisfactory for these invertebrate crops, because the animals feed slowly by tearing pieces from pellets or clumps. Existing fish chows generally lack proper durability or residence time during which the pellet remains intact.

Meyers et al., in "The Progressive Fish-Culturist," Vol. 34, No. 1, January 1972, at 9, point up the problem of feeding "slow feeders" such as carp, shrimp and prawns by the pelletized chows now available. With the slow feeders, pellet stability is essential both to prevent unfavorable pond conditions, such as fouling, and to achieve economically sound feed conversion rates. Only those rations with a minimum stability of 12 hours under water are considered acceptable for aquatic animals such as shrimp which require a constantly available food supply owing to their high metabolic rate and low energy reserves.

Although the acylation of proteins from hoofs, hair, blood, etc. has been reported by Kiel, in U.S. Pat. No. 2,728,759, the products obtained were used to waterproof leather goods and to impart water resistance to sausage casings. It is apparent that Kiel's materials would not be useful as a binder for aquacultural feeds and fish baits, which should readily imbibe moisture so as to appear like natural muscle tissue.

Of the binders generally in use for fish feed and baits, e.g. agar, alginates, carboxymethylcellulose, gelatin, gums and starches, only gelatin is nutritionally available as protein. However, even gelatin is of limited nutritional value because of lack of the essential amino acid tryptophan.

Thus, it is apparent that there is a continuing need for proteinaceous binders for fish feeds and baits which contain essential amino acids; permit fabrication of molded, extruded, or prilled products with a minimum of control over temperature conditions; provide products which take up water readily and have the elastic texture characteristic of natural muscle tissue; and provide products which maintain their shape in water and prevent the separation or attrition of particulate and nonparticulate nutritive components therefrom.

DESCRIPTION OF THE INVENTION

It has been found that a myofibrillar protein material acylated to the extent of at least 30 percent of the available amino groups provides a superior, nutritionally valuable binder material for particulate and nonparticulate nutritive components of firm, attrition-resistant aquacultural feeds and fish baits having the texture of natural muscle tissue.

It has further been found that aquacultural feed and fish bait compositions consisting essentially of up to about 25 percent by weight of the acylated myofibrillar protein material of this invention and at least one nutritive component can be processed with a minimum of control over temperature conditions; can be processed by molding, extrusion and pelletizing; provide high concentrations of protein containing all of the essential amino acids; have an elastic texture characteristic of natural muscle tissue; and maintain their shape in water and exhibit little or no tendency toward separation or attrition of particulate or other nutritive material therefrom.

Aquacultural feeds and fish bait compositions made by the process of this invention also have the water-binding capacity required to give tissue-like appearance and texture to the feed, are relatively stable to leaching od dyes and other additives therefrom, and have mechanical strength and texture such that the compositions can be impaled on a hook and hauled through the water while retaining their size and shape.

Other advantages of the compositions and methods of the present invention will be apparent from the specification and appended claims.

As used in the specification and claims, "aquaculture" means husbandry or farming of aquatic animals, including cold-water fish, secondary cold-water fish, warm-water fish, and marine fish as defined by P. Ghittino in Chapter 11 of "Fish Nutrition," edited by J. E. Halver, Academic Press, New York (1972).

It will be understood that practical fish husbandry or aquaculture has been needed in many parts of the world to obtain protein for the human population and to provide income for people living near waters adequate for holding and rearing fish. It will further be appreciated that an adequate diet, whether available naturally or supplied by aquaculturists, is the foundation upon which successful fish farming or aquaculture is based.

Aquacultural feeds made according to the present invention have been used in the culture of Malaysian prawn (Machrobrachium rosenbergii), Northern lobster (Homarus ssp.) and spot prawn (Pandalus platycenos) and are cited as examples of using these feeds in warm-water aquaculture.

Feed compositions suitable for the culture of rainbow trout (Salmo gairdnerii) have been prepared in accordance with this invention and are typical of compositions useful for cold-water aquaculture.

As used herein, "bait" means any composition used to attract fish and other aquatic animals, as defined above, by commercial or sport fishermen. Bait compositions prepared according to this invention are useful as attractants for salmonoid fish and halibut as typical of cold-water fish and of crab as typical of shellfish.

"Myofibrillar protein material," as used in the specification and claims means fibrils of muscular tissue derived from aquatic animals, including warm-water and cold-water fishes; poultry; and mammals, including cattle, horses, sheep and the like. For reasons of economy, protein material derived from generally underutilized and cheap aquatic animals is preferred. Especially preferred is myofibrillar protein derived from rockfish.

Myofibrillar protein material used for the purposes of this invention can be liberated from fish or any other selected muscle protein material using the principles taught by Patashnik in U.S. Pat. Nos. 3,726,689 and 3,730,728 by comminution in a saline medium.

Specifically, preground raw fish flesh or muscle of other animals is blded with a saline solution, preferably of sodium chloride and of other sodium salts, or mixtures thereof, to give a salt-solubilized myofibrillar protein mixture. The pregrinding is accomplished through the use of a food-type screw plate grinder having holes of ⅛ to ⅜ inches or similar equipment. The blending operation is carried out in a high-speed blender such as the gallon-sized Waring blender.

In order to disperse myofibrillar protein in the saline aqueous fraction of the fish or other protein material, while essentially homogeneously suspending and dispersing the oil fraction of the fish or other proteinaceous tissue in the aqueous fraction along with the other tissue constituents, the preground flesh prepared above is passed through an emulsifying apparatus or colloid mill such as machines discussed in Perry's "Chemical Engineers Handbook," 4th Edition, McGraw-Hill (1963), pages 8–14. Such a machine comminutes fish, poultry and meat solids to colloidal size, and thereby enables myofibrillar protein to be rapidly dispersed in the aqueous phase.

"Rockfish," for purposes of the specification and claims, means fish which live on rocky bottoms or among rocks. The terms includes members of the family Scorpaenidae, such as the black and red rockfish, cabezone and priestfish. Also included within the classification of rockfish are the striped bass family (Serranidae), the several groupers of the Florida and Bermuda water, and Northern Pacific food fishes, including the rock cod (genus Sebastodes). See, generally, "Webster's Third New International Dictionary," G. and C. Merriam Co., Springfield, Mass. (1967) under "rockfish."

"Acylation" in the specification and claims means the reaction between available terminal and pendant amino groups of the myofibrillar protein material and an acylating agent to form non-toxic metabolizable amide derivatives. The pendant amino group is the epsilon-amino group of lysine.

The product of the acylation reaction has a large number of available amino groups protected by acyl groups so that the charge and other physical characteristics of the protein are varied to produce the unique binder materials of this invention. The acylation of proteins is discussed in Chapter 5 of G. E. Means et al., "Chemical Modification of Proteins," Holden-Day, Inc., San Francisco (1971).

Binders useful in the practice of this invention are those in which at least 30 percent of the available terminal and pendant amino groups of the myofibrillar protein material are acylated. However, acylated myofibrillar protein materials preferred for the practice of this invention are those in which at least 40 percent of the available amino groups are acylated. Myofibrillar protein materials acylated up to nearly 100 percent of the available amino groups are entirely satisfactory as binder materials for the compositions of this invention.

The extent of acylation is determined by the amount of acylating agent used. Ratios of acylating agent to myofibrillar protein material which give between about 30 percent and as much as 100 percent acylation should be selected. The extent of acylation is determined with 2,4,6-trinitrobenzenesulfonic acid according to M. L. Kakade et al., "Analytical Biochemistry," Volume 27, at 273–280 (1969). Other analytical techniques are discussed in Means et al., supra, at 83–84.

"Acylating agent," as used herein, includes both acid chlorides and acid anhydrides of the $C_1 - C_{18}$ fatty acids and of $C_4 - C_8$ aliphatic and aromatic dicarboxylic acids. Both saturated and unsaturated acylating agents are within the scope of this invention. Among those which are useful for the purposes of this invention are acetic anhydride, acetyl chloride, butyric anhydride, maleic anhydride, fumaryl chloride, succinic anhydride, glutaric anhydride, oleyl chloride, palmitoyl chloride, benzoyl chloride, phthalic anhydride, adipoyl chloride and the like. Other acylating agents are disclosed in Means et al., supra, at 68–83.

The acid anhydrides are generally preferred for the practice of this invention because of easy availability, economy, and safety in handling, particularly under field conditions. Among the most preferred acylating agents are acetic, maleic, succinic and phthalic anhydrides.

"Nutritive component," as used in the specification and claims, means any particulate or non-particulate nutritive component bonded by the acylated myofibrillar protein materials of this invention. Particulate nutritive materials include muscle protein such as fish, poultry and meat, as well as synthetic fish chows of which Oregon Pellets are typical. Non-particulate nutritive components include unhydrogenerated and hydrogenated fish and vegetable oils.

For convenience, the particulate components used in the practice of this invention will usually be ground to the consistency of "hamburger" as described above prior to blending with the aqueous saline dispersion of acylated myofibrillar protein material. Alternatively, minced fish, meat or poultry can be used.

The nutritive material will be selected according to the intended use of the aquacultural feed or fish bait composition. Thus, Oregon Pellet or red crab were chosen as examples in feeds for post-larval lobsters, whereas an aromatic fish such as herring would be chosen for fish bait compositions. Fish oil can also be used as the nutritive and attractant non-particulate nutritive component of bait compositions.

"Oregon Pellets," as used in the specification and claims, means a fish diet formulation prescribed by the Fish Commission of Oregon. Typical compositions are set forth in the November 1969 specifications for Oregon Pellets Nos. 1 and 2.

In the practice of this invention, the acylated myofibrillar protein material is generally in the form of an aqueous saline, that is, sodium chloride or other sodium salts such as sodium acetate, sodium citrate, sodium lactate, sodium malate, and the like, and mixtures thereof, including mixtures containing minor amounts of water-soluble potassium or ammonium salts, dispersion containing from about 1 to about 10 percent by weight of acylated myofibrillar protein. Preferably, the dispersions contain from about 3 to about 5 percent by weight of acylated myofibrillar protein and the dispersion contains from about 2 to about 4 percent of sodium chloride.

Nutritive components comprising up to about 90 percent by weight of total solids and non-water content of the product are bonded together using the acylated myofibrillar protein dispersions of this invention. However, preferred compositions contain up to about 85 percent by weight of nutritive component, while the acylated myofibrillar protein binder comprises most of the remainder of the solid and non-water matter. However, bait and feed compositions containing up to at least 25 percent of acylated myofibrillar protein can be prepared and are within the scope of this invention.

"Additive," as used in the specification and claims, means any material other than water, salt, acylated myofibrillar protein material, and nutritive component which is used in the preparation of the aquacultural feeds and fish bait compositions of this invention. Such additive materials are generally selected from the group consisting of vitamins, minerals, hormones, dyes and antibiotics and are optional.

It will be appreciated that Oregon Pellets and similar synthetic fish chows used in the preparation of these feed compositions already contain a vitamin pre-mix and the addition of vitamins will be inappropriate. However, the vitamins used in the Oregon Pellet vitamin pre-mix are typical of those which can be added to feed compositions, if desired.

Among the vitamin and mineral additives which are frequently added, is iodine, such as is available in a polyvinylpyrrolidone-iodine complex. Addition of iodine, according to S. F. Snieszko in Halver, "Fish Nutrition," supra, at 405–408, is desirable and often mandatory to prevent the occurrence of thyroid tumors in hatchery-raised fish, such as the salmonoids. It will be understood that preferred forms of iodine for this purpose are those in which the iodine is bound to a chemical-binding agent so that iodine does not leach out from the feed too rapidly.

The addition of Vitamin E (alpha-tocopherol) is indicated when unhydrogenated oils and fats are present in the feed mixture. This material is considered more acceptable nutritionally as an antioxidant than butylhydroxyanisole (BHA) and butylhydroxytoluene (BHT), which are often used for this purpose. See L. Friedman et al., in Halver, "Fish Nutrition," supra, at 213–214.

The addition of antibiotics to the compositions of this invention is indicated when an outbreak of fish disease is being treated or when an antibiotic substance is being used prophylactically and as a growth-promoting substance. Typical of the antibiotics which are useful additives for aquacultural feed compositions are chlorotetracyclines, penicillin, bacitracin, streptomycin, sulfa drugs, and arsenilic acid. See L. Friedman et al., in Halver, "Fish Nutrition," supra, at 214–215.

Non-toxic dyes, e.g. vegetable dyes, can be added to the compositions of this invention to make the compositions appear attractive to the aquatic animal being fed or pursued. The addition of dyes is particularly significant in the preparation of bait compositions for fish which normally feed on highly pigmented bait materials. It has been found that non-toxic vegetable dyes and the like are highly substantive to the feed and bait compositions of this invention.

As to other additives to the compositions of this invention, any of the materials recited by L. Friedman et al., in Chapter 5 of Halver, "Fish Nutrition," supra, can be included.

It is to be understood that one of the advantages of the compositions of the present invention is that such compositions can readily be prepared at a feeding site, that is, at a fish hatchery or the like, and can thus be prepared in accordance with any problem situation which arises. Moreover, the compositions of this invention can be prepared beforehand in large quantities and can be frozen or stored under refrigeration until the time of use. It will be further understood that feed compositions of this invention can be pasteurized and stored at refrigerated temperatures without loss of their desirable properties.

The term "aqueous precipitating medium," as used herein, means an aqueous solution maintained at pH below about 4.5 by the use of an appropriate acid derivative.

Generally, the aqueous precipitating solution will be a solution containing from about 1 to about 10 percent by weight of an organic acid. Preferably from about 4 to about 6 percent by weight of the acid is used. Organic acids are preferred because the products obtained have physical properties, i.e. texture, superior to those obtained when an inorganic acid is used to acidify the aqueous precipitating medium. Organic acids suitable for this purpose include those having the requisite non-toxicity and solubility in water. Typical of useful acids are acetic, citric, gluconic, maleic, malic, fumaric, citraconic, mesaconic, itaconic and the like. Preferred acids include acetic and citric acids. When organic acids are used to acidify the precipitating medium, the precipitation can and is most conveniently done at ambient temperature, that is, between about 5° and about 40°C. It will be understood that the precipitation process can be carried out either at the feeding site or in a production facility.

Whenever a feedmixture is to be precipitated in a mold, the preferred technique is to add a lactone, such as glucono-lactone, to the homogeneous blend of acylated myofibrillar protein and nutritive component and to pour the entire mixture into a mold and to heat in a range between about 35+ and about 75°C.

It will be understood that formation of strings of the aquacultural feed or fish bait composition is accomplished by adding the homogeneous blend of acylated myofibrillar protein material and nutritive component continuously to the acidic aqueous precipitating medium, for example, by addition from a syringe.

When the feed or bait is to be used in the form of prills, the homogeneous blend should be added intermittently to the aqueous precipitating medium.

The density of the resulting product can be increased to provide a product which sinks in water by a de-aeration step prior to precipitation. If a low-density, floating product is desired, the de-aeration step is omitted.

Usually, the precipitated feed or bait composition will be washed with one or more portions of fresh water. However, this procedure is not mandatory.

The following examples are illustrative of the practice of this invention. However, it is to be understood that the examples are presented for the purpose of illustration only and that the invention is not limited to the compositions or methods shown therein.

EXAMPLE 1

A dispersion of 80 grams of myofibrillar rockfish protein in 2,000 milliliters of 3.5 percent aqueous saline solution in a four-liter beaker was reacted with 15 grams of succinic anhydride. The dispersion was cooled in an ice bath and stirred at a rate sufficient to keep the anhydride, which was added in amounts of 1.5 grams at intervals of five minutes, dispersed throughout.

At the beginning of the reaction, the pH of the solution was adjusted to 9.0 by addition of 2N sodium hydroxide solution. Thereafter, the pH of the reaction mixture was monitored constantly by a pH meter and maintained at pH 9.0 by the addition of 2N sodium hydroxide solution. After the last portion of anhydride was added, the pH was allowed to drift toward neutrality, so that at the end of two hours the pH was about 7.0.

The product of this reaction was succinylated to the extent of about 90 percent of available amino groups.

Dispersions prepared in the manner described above and corresponding to from about 30 percent up to about 100 percent acylation at a solids level between about 1 and about 10 percent by weight of acylated myofibrillar protein and between about 0.5 and about 5 percent of sodium chloride were used in the preparation of baits and feeds as described below.

EXAMPLE 2

A feed for post-larvel lobsters was prepared by mixing 44 grams of Oregon Pellet No. 2 with 200 grams of succinylated myofibrillar rockfish protein dispersion at room temperature in a Waring blender for five minutes at low speed and then for 10 seconds at high speed.

Entrapped air was removed from the homogeneous blend by evacuation under a pressure of about 25 millimeters of mercury while the viscosity of the blend was controlled by slow agitation using a magnetic stirrer.

The de-aerated mixture was extruded into a bath acidified with 5 percent of acetic acid through a syringe with a ⅛ inch orifice. The rate of extrusion was about 1–2 milliliters per second.

During the extrusion, the precipitating medium was stirred at room temperature with a magnetic stirrer at a rate such that the material being extruded was drawn away from the tip of the syringe. The extruded material was held in the stirred precipitating medium at room temperature for five minutes and then washed twice in about 200 milliliters of water.

The preparation thus obtained was a fiber about ⅛ inch in diameter and weighed about 10 grams at a solids level of about 24 percent.

Feeding tests with material prepared in this way showed that the form and texture of this product are attractive to the lobster, which consumed the feed with little waste.

EXAMPLE 3

Feed material suitable for post-larval lobsters was prepared by mixing 30 grams of dried pelagic red crab (shell removed), 200 grams of succinylated rockfish muscle protein dispersion in aqueous saline solution and 1 gram of alphatocopherol containing about 1,300 I.U. per gram as set forth in Example 2.

The de-aerated blend was prilled at room temperature in a bath containing about 5 percent of citric acid by intermittently pouring the homogeneous liquid dispersion into the precipitating medium from a height of about 12 inches. The prilled material was held in the precipitating medium for about 30 minutes at room temperature.

The resulting feed composition was spherical in form and had a diameter of about ⅜ inch. It was orange-red in color and had a solids content of about 27 percent.

EXAMPLE 4

Feed suitable for post-larvel lobsters was prepared as in Example 2 from 22 grams of dry, whole meal of mussel and 200 grams of succinylated rockfish muscle protein dispersion.

The homogeneous, de-aerated blend was extruded from a syringe ⅛ inch in diameter at a rate of 1–2 milliliters per second into an aqueous solution of citric acid stirred at room temperature. The extruded material was held in the acid solution for five minutes and then washed twice with 200 milliliter portions of water.

The feed thus obtained was a fiber about ⅛ inch in diameter. The product weighed about 10 grams and had a solids content of about 19 percent.

EXAMPLE 5

A feed composition suitable for larval shrimp was prepared by blending 30 grams of dry, whole mussel and 200 grams of succinylated myofibrillar rockfish protein dispersion for five minutes at low speed. After the addition of six grams of gluconic acid lactone, the mixture was blended at high speed for 10–20 seconds.

The resulting homogeneous blend was poured into a pan to a total thickness not exceeding 1 centimeter and heated for 1 hour at 50° C. to solidify the mixture. The solid feed was frozen and freeze dried.

The dried feed could be disintegrated by rubbing between two fingers into particles passing through a 20-mesh screen. This feed is appropriate for larval shrimp.

EXAMPLE 6

A feed enriched with iodine and suitable for juvenile trout animals was obtained by blending 38 grams of Oregon Pellet No. 2 with 200 grams of succinylated rockfish muscle protein dispersion in a blender for five minutes at low speed. A separate mixture of 4 grams of hydrogenated coconut oil and 4 grams of polyvinylpyrrolidone-iodine (10 percent active iodine) was prepared and warmed to transform the hydrogenated coconut oil to a fluid liquid and added to the acylated rockfish-Oregon Pellet blend slowly with stirring. Then, the entire mixture was blended for 10 seconds at high speed.

The product was extruded into aqueous citric acid and washed with water as described in Example 4.

The feed obtained was in the form of a fiber having the same diameter as the syringe and contained about 25 percent of solids.

The un-de-aerated product thus obtained floated on the surface of the water.

EXAMPLE 7

Bait suitable for attracting salmonoid fish was prepared by heating 50 grams of ground, whole herring at 80–90°C. for 20 minutes to deactivate the digestive enzyme. Then the herring was mixed with 200 grams of succinylated rockfish muscle protein dispersion in a blender for five minutes at low speed and for 10 seconds at high speed.

After the mixture was de-aerated, it was divided into four portions to the first of which nothing was added, to the second of which a red non-toxic vegetable dye was added, to the third of which a non-toxic yellow vegetable dye was added, and to the fourth of which a non-toxic green vegetable dye was added. The dyes were added carefully to minimize re-aeration of the blend.

Each of the four portions was prilled by being poured discontinuously from a height of about 12 inches into an aqueous solution of about 5 percent of citric acid.

The prilled products obtained were spherical in form and had diameters of ¼ to ½ inch. The compositions were rubbery in texture and had sufficient mechanical strength to maintain their form while being hauled through the water on a hook. The compositions were essentially colorfast and had a strong herring-like aroma.

EXAMPLE 8

Bait for halibut was obtained by mixing 20 grams of ground, eviscerated squid with 200 grams of a succinylated myofibrillar rockfish dispersion in a blender for 5 minutes at low speed and then for 10 seconds at high speed. The homogeneous blend was de-aerated as described in Example 3 and prilled by being poured discontinuously into an aqueous solution containing 5 percent of citric acid. The prilled product was held in the precipitating bath for 30 minutes at room temperature.

Product prepared in this manner has a rubbery texture, mechanical strength such that it could be hauled through the water on a hook, and exuded an aroma of fish oil.

EXAMPLE 9

Bait suitable for salmonoid fish was prepared by blending 20 grams of fish oil, 0.1 grams of rhodamine 6G, and 200 grams of maleylated rockfish muscle protein dispersion in a blender for five minutes at low speed and then for 10 seconds at high speed.

The de-aerated blend was prilled as set forth in Example 8. The product was essentially color-fast and maintained its form while being hauled through the water impaled on a hook. It had a strong fish-oil aroma.

What is claimed is:

1. A firm, attrition-resistant aquacultural feed and fish bait composition having the texture of natural muscle tissue, which consists essentially of up to about 25 percent by weight of total non-water solids of a nutritionally-valuable binder consisting of a moisture-imbibing myofibrillar protein material acylated to the extent of at least 30 percent of available terminal and pendant amino groups and at least one nutritive component.

2. The composition of claim 1, wherein the myofibrillar protein material is acylated myofibrillar rockfish protein.

3. The composition of claim 1, wherein the nutritive component is Oregon pellet feed.

4. The composition of claim 1, wherein the nutritive material is selected from the group consisting of unhydrogenated and hydrogenated vegetable and fish oils.

5. The composition of claim 1, which additionally contains an additive selected from the group consisting of vitamins, minerals, hormones, dyes and antibiotics.

6. The composition of claim 1, wherein the myofibrillar protein material binded blended homogeneously with at least one nutritive component is precipitated from a homogeneous blend of up to about 90 percent by weight of an aqueous saline dispersion containing between about 0.5 and about 5.0 percent by weight of sodium chloride and from about 1 to about 10 percent by weight of myofibrillar protein material acylated to the extent of at least 30 percent of available terminal and pendant amino groups by introduction into an aqueous precipitating medium maintained at a pH less than about 4.5 by between about 1 and about 10 percent by weight of an organic acid derivative at a temperature from about 5°C to about 75°C.

7. The composition of claim 6, wherein the aqueous precipitating medium is maintained at a pH less than about 4.5 by an organic acid selected from the group consisting of acetic and citric acids and at a temperature between about 15°C and about 40°C.

8. The composition of claim 6, wherein the aqueous precipitating medium is maintained at a pH less than about 4.5 by gluconolactone and at a temperature between about 35°C and about 75°C.

9. The composition of claim 1, wherein the nutritive component makes up to about 85 percent by weight of said composition.

* * * * *